UNITED STATES PATENT OFFICE.

WILHELM H. HEINE, OF HONOLULU, TERRITORY OF HAWAII.

FOOD PRODUCT AND PROCESS OF PREPARING THE SAME.

1,089,215.   Specification of Letters Patent.   Patented Mar. 3, 1914.

No Drawing.   Application filed May 6, 1913.   Serial No. 765,910.

*To all whom it may concern:*

Be it known that I, WILHELM H. HEINE, a citizen of the United States, residing at Honolulu, in the county of Honolulu and Territory of Hawaii, have invented new and useful Improvements in Food Products and Processes of Preparing the Same, of which the following is a specification.

My invention relates to an improved food product and process of preparing the same.

The object of the invention is to provide means whereby ripe bananas may be preserved as a new commercial commodity, so that they may be kept for a practically indefinite period with their flavor and taste practically unimpaired.

A further object of the invention is to provide a process of treatment whereby a food product of the character described may be simply and economically produced.

In carrying my invention into practice, I first select and peel full ripe bananas and then dry or evaporate the same to remove the moisture therefrom. The bananas are then hermetically sealed, preferably in a whole condition, in a suitable container, together with a preservative substance. This preservative substance may consist of a saccharine solution or liquid, such as sugar syrup or honey, or of a preservative gas, such as carbonic acid gas ($CO_2$). Before or after the container is sealed, the fruit, and also the preservative liquid, if desired, are subjected to a process of sterilization, which may be carried out in any of the ordinary ways. It will be understood, of course, that the preservative agent fills the pores of the fruit and seals the same against the action of the air, and that the process of sterilization destroys all bacteria and fermentative germs, thus providing a pure and wholesome fruit product which may be kept for a practically indefinite period and which retains its original taste, flavor and solidity.

I claim:—

1. As a new food product, dried bananas hermetically sealed in the presence of a preservative agent.

2. As a new food product, dried bananas hermetically sealed in the presence of a saccharine liquor.

3. As a new food product, dried bananas hermetically sealed in the presence of a sugar syrup.

4. The herein described process of producing a food product of the character described, which consists in drying peeled bananas to evaporate the moisture therefrom, and then hermetically sealing the same with a preservative agent.

5. The herein described process of producing a food product of the character described, which consists in drying peeled bananas to evaporate the moisture therefrom, and then hermetically sealing the same with a saccharine liquor.

In testimony whereof I affix my signature in presence of two witnesses.

WILHELM H. HEINE.

Witnesses:
DAVID W. ANDERSON,
ADELAIDE C. FRANCA.